March 12, 1957  H. A. BLOCK  2,784,610
SPEED REDUCER
Filed Jan. 28, 1953  3 Sheets-Sheet 1
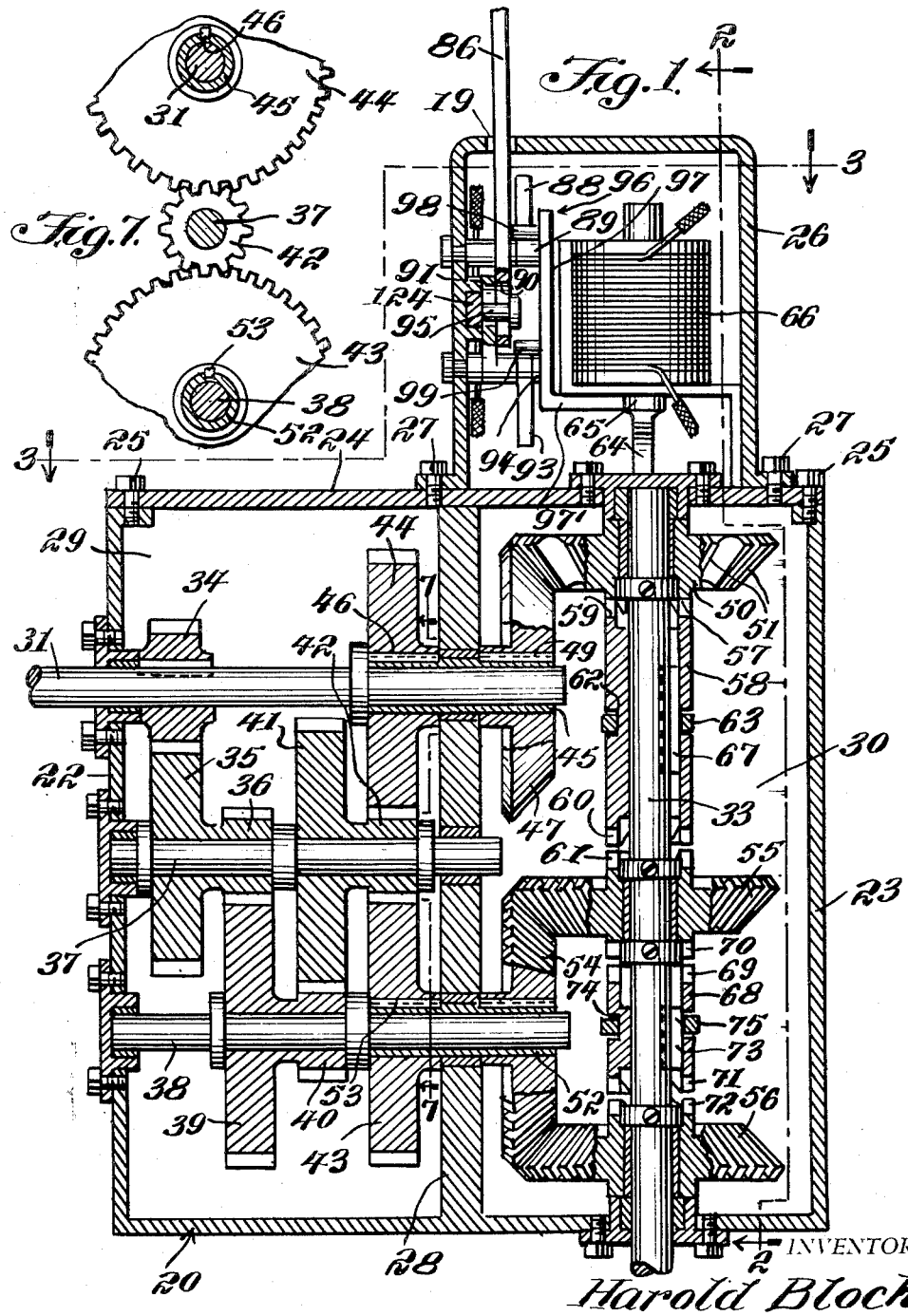
INVENTOR.
Harold Block,
BY Victor J. Evans & Co.
ATTORNEYS March 12, 1957     H. A. BLOCK     2,784,610
SPEED REDUCER
Filed Jan. 28, 1953     3 Sheets-Sheet 2
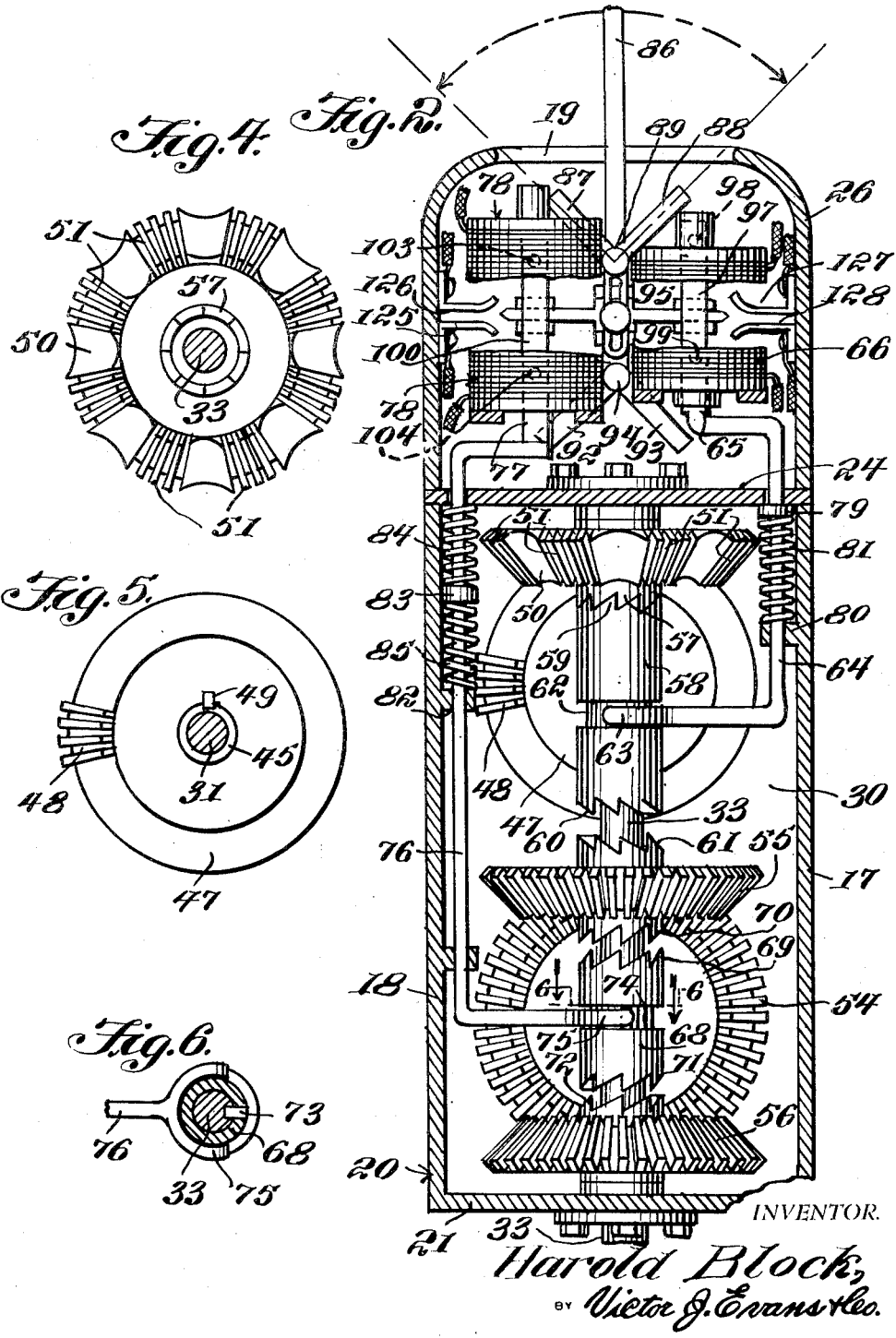
INVENTOR.
Harold Block,
BY Victor J. Evans & Co.
ATTORNEYS

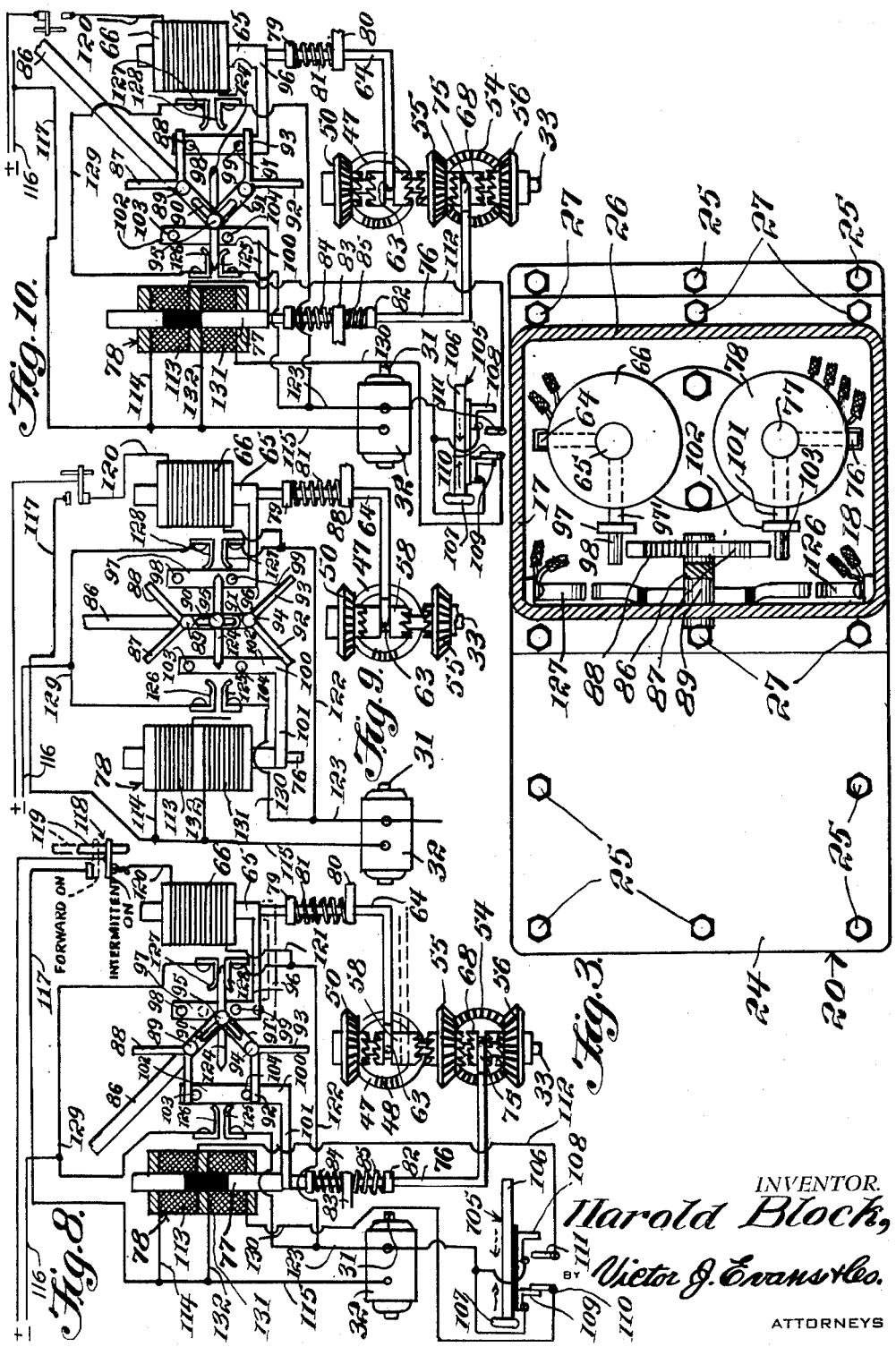

United States Patent Office 2,784,610
Patented Mar. 12, 1957

2,784,610
SPEED REDUCER

Harold Anthony Block, Manistee, Mich.

Application January 28, 1953, Serial No. 333,802

1 Claim. (Cl. 74—374)

This invention relates to a motion control and speed reducing mechanism, and more particularly to a mechanism for controlling of motion and a set reduced speed of rotation of a driven shaft.

The object of the invention is to provide a speed reducing and motion control mechanism which is adapted to be used for operatively connecting a drive shaft to a driven shaft whereby the speed and motion of the driven shaft can be reduced and the motion controlled as desired.

Another object of the invention is to provide a speed reducing and motion control mechanism which can be controlled in various ways, such as by a manually operable lever, a remote control station and by automatic means, there being a mechanism provided for causing the driven shaft to be rotated in a clockwise or counterclockwise direction, and wherein the driven shaft can be driven intermittently or continuously as desired.

A still further object of the invention is to provide a speed reducing and motion control mechanism which can be used for causing forward, reverse, or intermittent speed and motion of a driven shaft, and wherein there is provided a manually operable lever for controlling the driven shaft and there is also provided a means for automatically controlling the driven shaft and a means for controlling the driven shaft from a remote position.

A further object of the invention is to provide a speed reducing and motion control mechanism which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a longitudinal sectional view taken through the speed reducing mechanism of the present invention;

Figure 2 is a sectional view taken on the line 2—2 of Figure 1;

Figure 3 is a sectional view taken on the line 3—3 of Figure 1;

Figure 4 is a plan view of the intermittent gear;

Figure 5 is a plan view of the gear for engaging the intermittent gear of Figure 4;

Figure 6 is a sectional view taken on the line 6—6 of Figure 2;

Figure 7 is a sectional view taken on the line 7—7 of Figure 1;

Figure 8 is a schematic wiring diagram showing the position of the parts which the driven shaft is driven intermittently;

Figure 9 is a view similar to Figure 8 but showing the position of the parts when the motor is off as when the handle is in neutral position;

Figure 10 is a view showing the handle being used for locking the mechanism in neutral position and wherein the driven shaft can be driven with a forward and reverse motion with the same being regulated at a remote control station.

Referring in detail to the drawings, the numeral 20 designates a housing which may be fabricated of any suitable material, and the housing 20 includes a bottom wall 21 and end walls 22 and 23. A top wall or cover 24 is detachably connected to the rest of the housing by suitable securing elements such as screws or bolts 25, Figures 1 and 3. Mounted on the top wall 24 of the housing is a casing 26, the casing 26 being connected to the top wall 24 by suitable screws or bolts 27. A partition 28 is positioned in the housing 20, and the partition 28 defines a pair of compartments 29 and 30 within the housing.

Extending into the housing 20 is a drive shaft 31, and the drive shaft 31 is adapted to be rotated by means of a suitable motor 32. A driven shaft 33 extends through the compartment 30, and the shaft 33 is arranged at right angles with respect to the drive shaft 31. The driven shaft 33 may lead to any suitable mechanism which is being operated.

Positioned in the compartment 29 is a gear train which includes a gear 34 that is keyed to the drive shaft 31, Figure 1. A pair of shafts 37 and 38 are supported in the housing 20, and the gear 34 meshes with a gear 35 which is mounted on the shaft 37. Formed integral with the gear 35 is a smaller gear 36 and the small gear 36 meshes with a large gear 39 that is mounted on the shaft 38. Formed integral with the gear 39 is a smaller gear 40, and the smaller gear 40 meshes with a large gear 41 that is mounted on the shaft 37. Formed integral with the gear 41 is a smaller gear member 42. A pair of gear wheels 43 and 44 are arranged in meshing engagement with the small gear 42, and the gear 43 being mounted on the shaft 38, and the gear 44 being mounted on the shaft 31.

Mounted on the drive shaft 31 is a sleeve 45, Figures 1 and 7, and the gear 44 is keyed to the sleeve 45 by means of a key 46, Figure 7. Arranged on the opposite side of the partition 28 from the gear 44 is a gear 47, Figure 5, and the gear 47 is provided with a single set of teeth 48. The gear 47 is keyed to the sleeve 45 by means of a key 49. Arranged at right angles with respect to the gear 47 is an intermittent gear 50, and it will be seen that the gear 50 is provided with a plurality of sets of teeth 51, Figure 4. The sets of teeth 51 are evenly spaced from each other and therefore it will be seen that for each revolution of the gear 47, there will be only one-eighth of a revolution of the gear 50. As later described in this application, this will selectively effect an intermittent rotation of the driven shaft 33.

Mounted on the shaft 38 is a sleeve 52, and the gear 43 is keyed to the sleeve 52 by means of a key 53, Figures 1 and 7. A bevel gear 54 is also keyed to the sleeve 52, and the bevel gear is arranged in meshing engagement with a pair of gears 55 and 56. The intermittent gear 50, and the bevel gears 55 and 56 are loosely mounted on the driven shaft 33. The bevel gear 55 is adapted to rotate the driven shaft 33 in a forward direction, while the bevel gear 56 is adapted to be used for driving the driven shaft 33 in a reverse direction.

Formed integral with the intermittent gear 50 is a plurality of teeth 57, and slidably mounted on the driven shaft 33 is a clutch member 58. The clutch member 58 has teeth 59 and one end thereof which are adapted to selectively engage the teeth 57 which are connected to the gear 50. On the other end of the clutch member 58 are teeth 60 which are mounted for movement into and out of engagement with teeth 61 that are connected to the gear 55. The clutch member 58 is provided with an annular groove 62 and projecting into the groove 62 is a yoke 63 which is secured to a movable bar 64, the upper end of the bar 64 being secured to a core 65 that is mounted for movement in a solenoid 66. The clutch member 58 is keyed to the driven shaft 33 by a keyway 67, Figure 1.

A second clutch member 68 is slidably mounted on the driven shaft 33, and the clutch member 68 has teeth 69 on one end that are mounted for movement into and out of engagement with teeth 70 which are secured to the bevel gear 55. On the other end of the clutch member 68 are teeth 71 which are mounted for movement into and out of engagement with teeth 72 which are secured to the gear 56.

The clutch member 68 is keyed to the driven shaft 33 by means of a key 73, and the clutch member 68 is provided with an annular groove 74 into which projects a shifting yoke 75 that is arranged on an end of a rod 76. The upper end of the rod 76 is secured to a movable core 77 which is adapted to be shifted by a two-part solenoid 78.

The rod 64 slidably projects through a lug 80, and a collar 79 is secured to the rod 64, there being a coil spring 81 interposed between the collar 79 and the lug 80, the coil spring 81 serving to normally urge the rod 64 to its raised position so that the teeth 59 are normally urged into a position in engagement with the teeth 57. The other rod 76 slidably projects through a lug 82, and a collar 83 is connected to the rod 76. A pair of coil springs 84 and 85 are circumposed on the rod 76 on opposite sides of the collar 83 for a purpose to be later described.

The mechanism of the present invention further includes a manually operable lever 86, Figure 1 and Figures 8–10, and the lever or handle 86 has a pair of right angularly arranged arms 87 and 88 connected thereto by a suitable securing element such as a pin or bolt and nut assembly 89. The lever 86 is provided with a slot 90, and a slotted link 91 is pivotally connected to the lever 86 by a pin 95. A pair of bars 92 and 93 are connected to the other end of the slotted link 91 by a pin 94. There is further provided a bracket 96 which has a substantial L-shape, and the bracket 96 includes a straight portion 97 that is secured to the core 65 of the solenoid 66 in any suitable manner, as for example by welding. The bracket 96 further includes a straight portion 97 which is provided with a pair of lock pins 98 and 99 which are adapted to be selectively engaged by the arms 88 and 93 upon actuation of the lever or handle 86.

There is further provided an L-shaped bracket 100 which includes a straight section 101 that is secured to the movable core 77 of the two-part solenoid 78. The bracket 100 further includes a straight portion 102 which has a pair of lock pins 103 and 104 extending therefrom. The pins 103 and 104 are adapted to be selectively engaged by the arms 87 and 92 upon actuation of the handle 86.

A push pull switch 105 is provided whereby the operation of the speed reducing mechanism of the present invention can be controlled from a remote location. The push pull switch 105 includes a movable bar 106 that is actuated by a handle or knob 107. Carried by the bar 106 is a pair of L-shaped contacts 108 and 109, and these contacts are mounted for movement into and out of engagement with a pair of stationary contacts 111 and 110. A wire 112 leads from the stationary contact 111 to the upper part 113 of the two-part solenoid 78. A wire 114 leads from the solenoid 113.

The wiring diagram for the present invention is shown schematically in Figures 8–10. Thus, the electric motor 32 has a wire 115 leading therefrom and the wire 115 leads from a main supply line 116 which may be connected to any suitable source of electrical energy. Leading from the supply line 116 is a wire or cable 117 which is connected to an automatic switch 118. The automatic switch 118 includes a movable button 119 which may be operated by a suitable machine upon the happening of a pre-selected condition. A wire 120 leads from the switch 118 to the solenoid 66, and a wire 121 leads from the solenoid 66 to a cable 122 which is connected to a wire 123, the wire 123 being also connected to the electric motor 32.

A slide or movable element 124 is pivotally connected to the lever 86 by means of the pin 95, and the slide 124 has one of its ends mounted for movement into and out of engagement with a pair of spaced contacts 125 and 126. The other end of the slide 124 is mounted for movement into and out of engagement with a pair of contacts 127 and 128. A wire 129 serves to electrically connect the contacts 126 and 128 to the main supply line 116. A wire 130 serves to connect the lower solenoid part 131 of the two-part solenoid 78 to the contact 110, while a line 132 serves to connect the solenoid 131 to the line 115.

The lever or handle 86 is adapted to slidably project through a slot 19 in the casing 26, and the housing 20 includes side walls 17 and 18.

In use, the motor 32 may be energized to thereby rotate the drive shaft 31 and this causes movement of the gear train which is positioned within the compartment 29. Thus, as the shaft 31 rotates, the gear 34 rotates the gear 35 and this in turn causes rotation of the gear 39 through the gear 36. Rotation of gear 39 causes rotation of gear 41 through the gear 40, and therefore the gear 42 rotates gears 44 and 43. Gear 44 rotates gear 47, while gear 43 rotates gear 54. The gears 55 and 56 are constantly rotated by the gear 54, but since gears 55 and 56 are loose on the driven shaft 33, then the gears 55 and 56 will not rotate the driven shaft 33 until the clutch member 68 or the clutch member 58 is mounted into engagement with one of the gears. Similarly, the gear 50 is being constantly rotated by the gear 47, but the gear 50 does not rotate the driven shaft 33 until the clutch member 58 is moved up to cause the teeth 59 to engage the teeth 57.

To manually control the operation of the driven shaft 33, the lever or handle 86 may be shifted to the position shown in Figure 8. Thus, when the lever 86 in the position shown in Figure 8 the slide 124 is in contact with the elements 127 and 128 to thereby complete the circuit so that the driven shaft 33 is operated with either an intermittent or a continuous forward motion. The switch 118 controls the forward motion of the driven shaft. With the lever as shown in Figure 8, the arm 87 engages the pin 103, and the arm 92 engages the pin 104 and this maintains the clutch 68 in this position.

In Figure 9 the lever 86 is shown in a neutral position so that the slide 124 is not engaging either set of contacts. Also, with the lever 86 in this position, the pins 103 and 104, 98 and 99 are not engaged by the arms 87, 88, 92 or 93. This Figure 9 position is a neutral position so that there is no current to the motor 32 so that the entire set-up is stationary.

In Figure 10, the lever 86 is shown in still another position whereby the arm 88 engages the pin 98, and the arm 93 engages the pin 99 to thereby lock the clutch member 58 in this position. Also, in this Figure 10 position the slide 124 engages the contacts 125 and 126 to thereby complete the circuit to the motor 32 and to either one of the solenoids 113 or 131 according to how the switch 105 is set. This arrangement permits the driven shaft 33 to be operated in a forward or a reverse direction at a continuous rate of speed rather than intermittently.

The push pull switch 105 can be actuated by manually grasping the knob 107 so that the contacts 108 and 109 can be moved into and out of engagement with the contacts 110 and 111. When the solenoids are not energized, the springs 84 and 85 hold the clutch 68 in neutral position. Also, the spring 81 serves to normally maintain the teeth 59 meshing with the teeth 57.

In the Figure 8 position, the motor 32 is running and the driven shaft is being rotated intermittently. In the Figure 10 position, the driven shaft can either be driven in a forward or reverse direction. Thus, there is provided a speed reducing mechanism which includes a remote and automatic control so that the driven shaft can be driven intermittently, and in a forward and reverse direction.

I claim:

In a speed reducing mechanism, a housing including a bottom wall and spaced parallel end walls, a cover detachably connected to said housing, a casing mounted on said cover and secured thereto, a partition arranged in said housing and defining a first and second compartment, a drive shaft extending into said housing through said first compartment and adapted to be connected to a power source, a driven shaft arranged at right angles with respect to said drive shaft and extending through said second compartment, a gear train positioned in said first compartment and including a first gear keyed to said drive shaft, a first and second stub shaft supported in said housing, a second gear mounted on said first stub shaft and meshing with the first gear on said drive shaft, a third gear formed integral with said second gear, a fourth gear mounted on said second stub shaft and meshing with said third gear, a fifth gear formed integral with said fourth gear, a sixth gear mounted on said first stub shaft and meshing with said fifth gear, a gear member formed integral with said sixth gear, a first and second gear wheel meshing with said gear member, a sleeve circumposed on said drive shaft and keyed to said first gear wheel, a seventh gear keyed to said sleeve and provided with a single set of teeth, an intermittent gear loosely mounted on said driven shaft and provided with a plurality of evenly spaced sets of teeth for selective engagement with the teeth on said seventh gear, a sleeve mounted on said second stub shaft and keyed to said second gear wheel, an eighth gear keyed to said last named sleeve, a ninth and tenth gear loosely mounted on said driven shaft and meshing with said eighth gear, said ninth gear adapted to rotate said driven shaft in a forward direction and said tenth gear adapted to rotate said driven shaft in a reverse direction, a first clutch member for causing said intermittent gear and driven shaft to rotate in unison, a second clutch member for causing said driven shaft to rotate in unison with said ninth or tenth gear, and electromagnetic means for operating said clutch members.

References Cited in the file of this patent
UNITED STATES PATENTS

| | | |
|---|---|---|
| 828,648 | Gibbs | Aug. 14, 1906 |
| 959,863 | Jacobs | May 31, 1910 |
| 1,130,134 | Baldwin | Nov. 2, 1915 |
| 2,150,213 | Everett | Mar. 14, 1939 |
| 2,240,213 | Altorfer | Apr. 29, 1941 |
| 2,462,393 | Haynes | Feb. 22, 1949 |